(12) United States Patent
Zhao et al.

(10) Patent No.: US 11,245,286 B2
(45) Date of Patent: Feb. 8, 2022

(54) POWER RECEIVING ANTENNA CONFIGURED IN A WEARABLE ELECTRONIC DEVICE

(71) Applicant: Silergy Semiconductor Technology (Hangzhou) LTD, Hangzhou (CN)

(72) Inventors: Chen Zhao, Hangzhou (CN); Wang Zhang, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 461 days.

(21) Appl. No.: 15/673,614

(22) Filed: Aug. 10, 2017

(65) Prior Publication Data

US 2018/0062431 A1    Mar. 1, 2018

(30) Foreign Application Priority Data

Aug. 31, 2016  (CN) .......................... 201610795705.5

(51) Int. Cl.
| | | |
|---|---|---|
| *H02J 50/10* | (2016.01) | |
| *H01Q 1/22* | (2006.01) | |
| *H01Q 1/27* | (2006.01) | |
| *H02J 50/23* | (2016.01) | |
| *H02J 50/00* | (2016.02) | |
| *H01Q 1/48* | (2006.01) | |
| *G06F 1/26* | (2006.01) | |
| *H01Q 7/00* | (2006.01) | |
| *G06F 1/16* | (2006.01) | |

(52) U.S. Cl.
CPC .............. *H02J 50/10* (2016.02); *G06F 1/26* (2013.01); *H01Q 1/2258* (2013.01); *H01Q 1/273* (2013.01); *H01Q 1/48* (2013.01); *H01Q 7/00* (2013.01); *H02J 50/00* (2016.02); *H02J 50/23* (2016.02); *G06F 1/163* (2013.01)

(58) Field of Classification Search
CPC ......... G06F 1/26; G06F 1/163; H01Q 1/2258; H01Q 1/273; H01Q 1/48; H01Q 7/00; H02J 50/00; H02J 50/10; H02J 50/23

See application file for complete search history.

(56) References Cited

U.S. PATENT DOCUMENTS

| | | | | |
|---|---|---|---|---|
| 7,162,217 B2* | 1/2007 | Bisig | ...................... | G04G 21/04 |
| | | | | 343/718 |
| 9,362,778 B2 | 6/2016 | Lee et al. | | |
| 2015/0115726 A1* | 4/2015 | Kang | ...................... | H02J 50/40 |
| | | | | 307/104 |

(Continued)

FOREIGN PATENT DOCUMENTS

| | | | |
|---|---|---|---|
| CN | 203422610 U | * | 2/2014 |
| CN | 203422610 U | | 2/2014 |

OTHER PUBLICATIONS

Translation of CN 203422610 (Year: 2014).*

*Primary Examiner* — Rexford N Barnie
*Assistant Examiner* — Elim Ortiz

(57) ABSTRACT

A power receiving device of a contactless power supply configured in a wearable electronic device having a main body coupled to a wearing member, can include: a power receiving antenna including one or more coils at least partially disposed on the wearing member; and where wires of the receiving coils extend substantially along a surface of a wearing member to form a coil turn that crosses through the surface of the wearing member or a surface of the main body in an axial direction.

11 Claims, 10 Drawing Sheets

(56) References Cited

U.S. PATENT DOCUMENTS

2015/0188352 A1    7/2015  Peek et al.
2016/0012968 A1*   1/2016  Chiu ................... H01F 27/2823
                                                          320/108
2018/0294844 A1*  10/2018  Choi ..................... G06F 3/0488

* cited by examiner

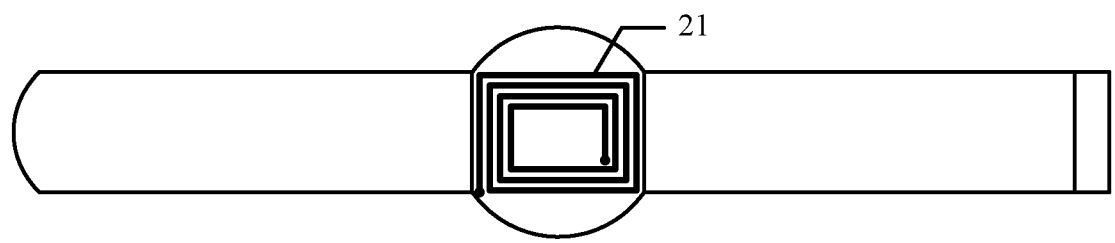
FIG. 1A (conventional)

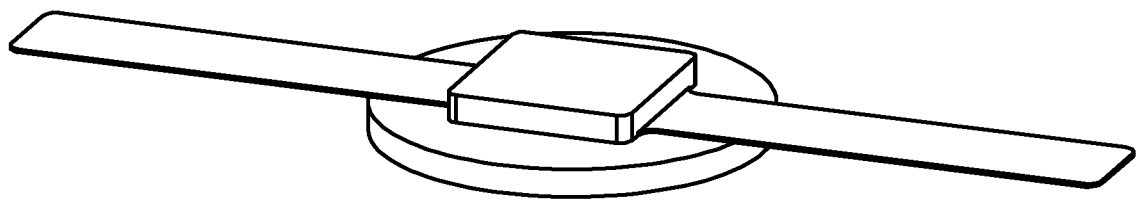
FIG. 1B (conventional)

POWER RECEIVING ANTENNA CONFIGURED IN A WEARABLE ELECTRONIC DEVICE

RELATED APPLICATIONS

This application claims the benefit of Chinese Patent Application No. 201610795705.6, filed on Aug. 31, 2016, which is incorporated herein by reference in its entirety.

FIELD OF THE INVENTION

The present invention generally relates to the field of contactless power supplies, and more particularly to power receiving antennas and associated wearable electronic devices.

BACKGROUND

Contactless power supply techniques are becoming widely used in electronic products, such as mobile phones, MP3 players, digital cameras, laptops, and so on. In one resonance-type contactless power supply approach, a coupling circuit can include a power transmitting antenna and a power receiving antenna. The power transmitting antenna and other components in a power transmitter may form a transmitter-side resonant circuit, and the power receiving antenna and other components in a power receiver may form a receiver-side resonant circuit. Electric energy can be transferred in a contactless manner when the transmitter-side resonant circuit and the receiver-side resonant circuit have the same resonance frequency. The receiver-side resonant circuit can be coupled to the transmitter-side resonant circuit via electromagnetic field, and may thus resonate when the transmitter-side resonant circuit resonates.

BRIEF DESCRIPTION OF THE DRAWINGS

FIG. 1A is a diagram of an example power receiving antenna.

FIG. 1B is a diagram of an example wearable electronic device and a power transmitter.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Contactless power supply techniques or wireless charging techniques have good applicable in wearable electronic devices. Referring now to FIG. 1A, shown is a diagram of an example power receiving antenna. Also referring to FIG. 1B, shown is a diagram of an example wearable electronic device and a power transmitter. In a wearable electronic device, such as a smart watch, a power receiving antenna may typically only be disposed on the main body (e.g., dial) of the wearable device. Because the main body of the wearable electronic device normally has a relatively small volume, the coil area of the power receiving antenna will be limited to the area of the set surface. Such an arrangement may not be conducive to the transmission of wireless power, and may result in lower system efficiency.

In the examples herein, a smart watch is generally described; however, those skilled in the art will recognize that certain embodiments are not limited to smart watches, but can include any other wearable electronic devices with a wearing member (e.g., a Bluetooth earphone, a smart headband, a smart glasses, etc.). In one embodiment, a power receiving device of a contactless power supply configured in a wearable electronic device having a main body coupled to a wearing member, can include: (i) a power receiving antenna including one or more coils at least partially disposed on the wearing member; and (ii) where wires of the receiving coils extend substantially along a surface of a wearing member to form a coil turn that crosses through the surface of the wearing member or a surface of the main body in an axial direction.

Figure 2A:
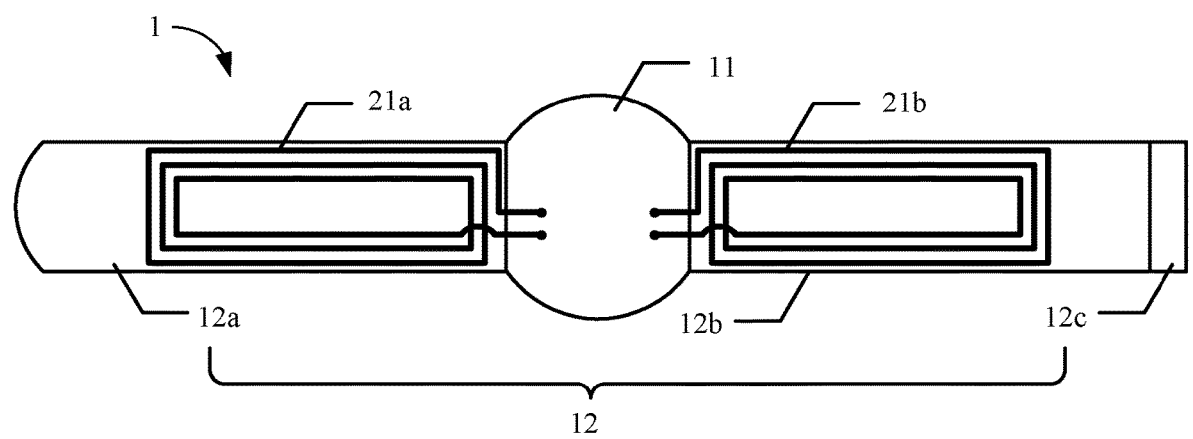
FIG. 2A is a diagram of an example power receiving antenna, in accordance with embodiments of the present invention.

Referring now to FIG. 2A, shown is a diagram of an example power receiving antenna, in accordance with embodiments of the present invention. In this particular example, smart watch 1 provided with a power receiving antenna can include main body 11 and watchband 12. Main body 11 may be an entity for performing the functions of the smart watch. Main body 11 can include a watchcase, a display device located inside the watchcase or integrated with the watchcase, a human-computer interaction device, a processing circuit, a power supply, etc. In order to receive the wireless power supply, main body 11 can also include contactless power receiving circuit 2 (see, e.g., FIG. 2B). Contactless power receiving circuit 2 can receive power from a power transmitter in a contactless or wireless manner.

Figure 2B:
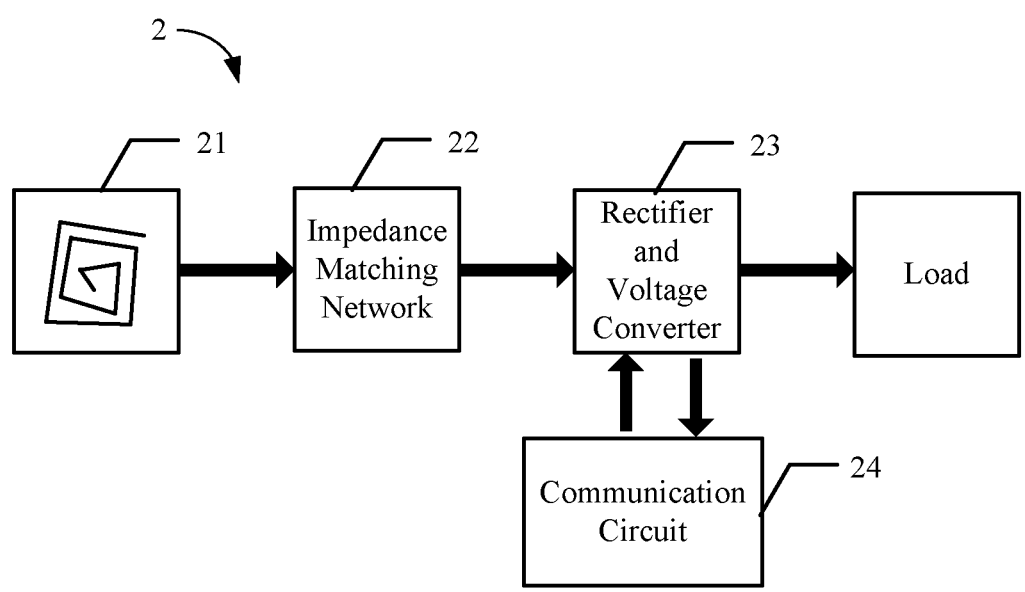
FIG. 2B is a diagram of an example contactless power receiving circuit, in accordance with embodiments of the present invention.

Referring now to FIG. 2B, shown is a diagram of an example contactless power receiving circuit, in accordance with embodiments of the present invention. In this particular example, contactless power receiving circuit 2 can include power receiving antenna 21, impedance matching network 22, and rectifier and voltage converter 23. Contactless power receiving circuit 2 can also include communication circuit 24 for communicating with the power transmitter when necessary. Referring also to FIG. 2A, watchband 12 can be used to wear main body 11 on a human body (e.g., to wear on the wrist of a human). Watchband 12 can include portions 12*a* and 12*b* that are mechanically coupled to main body 11. Two portions may be coupled with each other through connection portion 12*c*, such that the smart watch is in the form of a ring, and is fixed on the human's arm. Watchband 12 may only include one portion with one terminal coupled to main body 11 in a fixed manner, and the other terminal coupled to the other side of main body 11 in a detachable manner.

Power receiving antenna 21 can include receiving coils 21*a* and 21*b*. The receiving coil can include conducting wires extending along the surface of the watchband. Receiving coil 21*a* may be disposed on portion 12*a* of watchband 12, and receiving coil 21*b* may be disposed on portion 12*b* of watchband 12. Receiving coil 21*a* may form at least one coil turn that crosses through the surface of portion 12*a* of the watchband in an axial direction. In addition, receiving coil 21*b* may form at least one coil turn that crosses through the surface of portion 12*b* of the watchband in an axial direction. The plurality of coil turns may be concentric when forming a plurality of coil turns. The leading ends of receiving coils 21*a* and 21*b* may extend to main body 11 to facilitate connection with the circuits provided in main body 11.

Since watchband 12 has a larger area relative to the dial (e.g., main body 11), the receiving coil may be disposed on the watchband. This effectively increases the area of the receiving coil, provides a greater degree of freedom for the product circuit design, and effectively improves the efficiency of receiving the wireless power supply of the wearable electronic device. Therefore, the power receiving antenna disposed in this way can provide a greater degree of freedom for the design of the power transmitter.

Figure 3A:
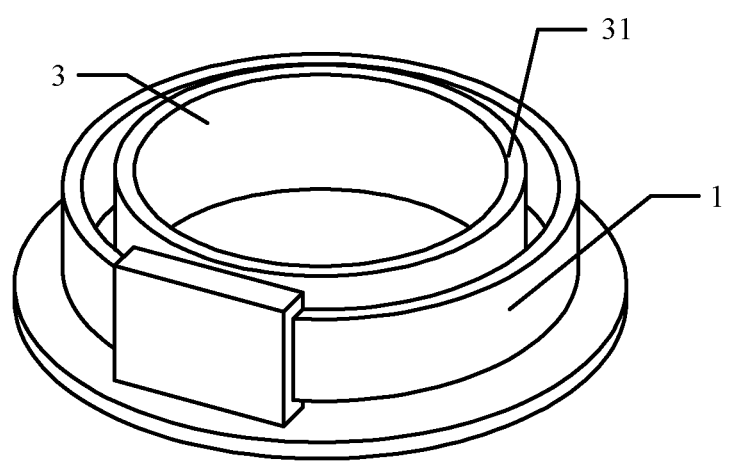
FIG. 3A is a diagram of an example wearable electronic device coupling with a power transmitter, in accordance with embodiments of the present invention.

Referring now to FIG. 3A, shown is a diagram of an example wearable electronic device coupling with a power transmitter, in accordance with embodiments of the present invention. Typically, the coil of the power receiving antenna and the coil of the power transmitting antenna should share a coaxial center axis. In this particular example, two portions of watchband 12 can be coupled together as a ring shape, and may be disposed on power transmitter 3 with a portion being formed as a cylinder. Power transmitting antenna 31 of power transmitter 3 can be disposed on the side of the cylinder, and the axis of the transmitting coil can be the normal line of the side of the cylinder. Thus, an improved coupling coefficient can be achieved by coinciding with the axis of the receiving coil extending along the curved surface of the watchband. Also, the plurality of receiving coils may operate simultaneously, or in a selectable manner. A transmitting coil-receiving coil pair with the best coupling coefficient can be selected when the plurality of receiving coils operate in a selectable manner. Power can be transmitted based on the selected coil pair, in order to improve the transmission efficiency.

Figure 3B:
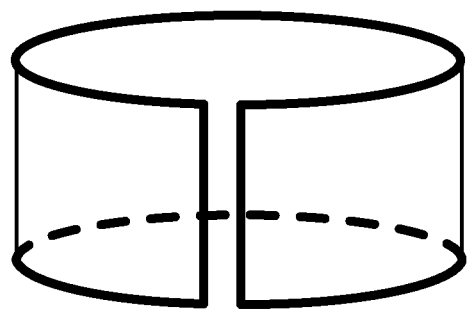
FIG. 3B is a diagram of an example power transmitting antenna, in accordance with embodiments of the present invention.

Referring now to FIG. 3B, shown is a diagram of an example power transmitting antenna, in accordance with embodiments of the present invention. In this particular example, the coil of the transmitting antenna can extend along the edges of the upper surface and the lower surface and the sidelines of the cylinder, in order to form an uniform magnetic field on the side of the cylinder. When the transmitting antenna covers the sides of the entire main body, no matter which direction smart watch 1 is oriented, substantially the same power receiving effect can be obtained, and the positional degree of freedom of the power receiver can accordingly be improved.

Figure 4:
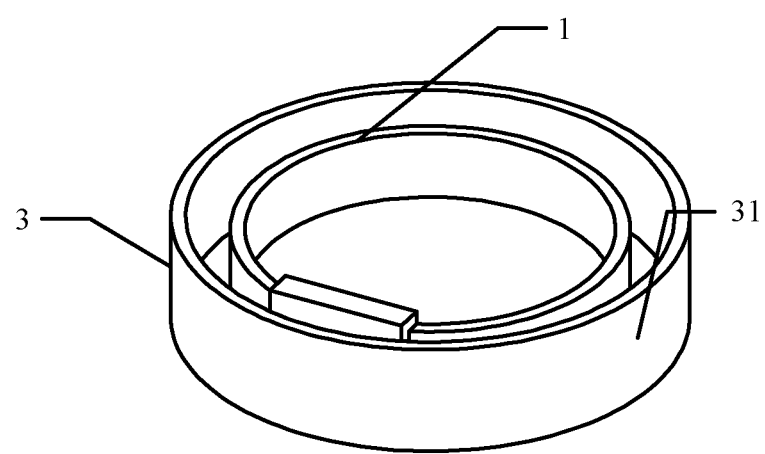
FIG. 4 is a diagram of an example wearable electronic device coupling with a power transmitter, in accordance with embodiments of the present invention.

Referring now to FIG. 4, shown is a diagram of an example wearable electronic device coupling with a power transmitter, in accordance with embodiments of the present invention. In this particular example, power transmitting antenna 31 of the power transmitter may be disposed on the side of the cylinder. Here, the smart watch with two portions of the watchband coupled as a ring shape may be placed inside the cylinder. Similarly, when the transmitting antenna covers the sides of the entire main body, no matter which direction the smart watch 1 is oriented, the same power receiving effect can occur.

Figure 5:
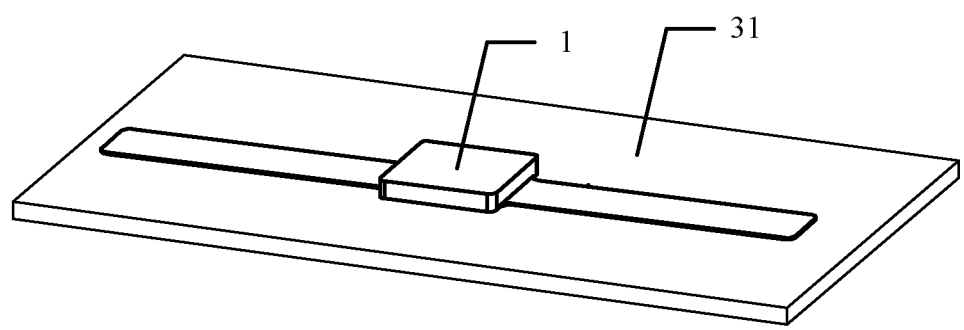
FIG. 5 is a diagram of another example wearable electronic device coupling with a power transmitter, in accordance with embodiments of the present invention.

Referring now to FIG. 5, shown is a diagram of another example wearable electronic device coupling with a power transmitter, in accordance with embodiments of the present invention. In this particular example, the entire smart watch 1 may be deployed on power transmitter 3 with the power transmitting antenna in a planar form. When smart watch 1 is unfolded as a plane, the axes of receiving coils 21*a* and 21*b* may be perpendicular to the plane of the watchband. A better coupling coefficient can be achieved by adjusting the position of receiving coils 21*a* and 21*b* to coincide with the axes of the power transmitting antenna in a planar form. Because receiving coils 21*a* and 21*b* are disposed on the watchband, a larger coil area can be obtained, and thus a higher system efficiency can be achieved.

In this example, watchband 11 can be at least partially made of a flexible material, such that watchband 11 can be easily coupled as a ring shape or unfolded as a planar form. Alternatively, watchband 11 or the wearing members of other wearable electronic devices can be made of substantially rigid materials, and may have a curved surface or a plane for providing the receiving antenna. Also, the receiving coil can be formed on the surface of the watchband or inside the watchband. Although receiving coils may both be disposed on watchband 12, the area covered by the receiving coils can be extended to main body 11, in order to obtain a larger coiling area.

Figure 6:
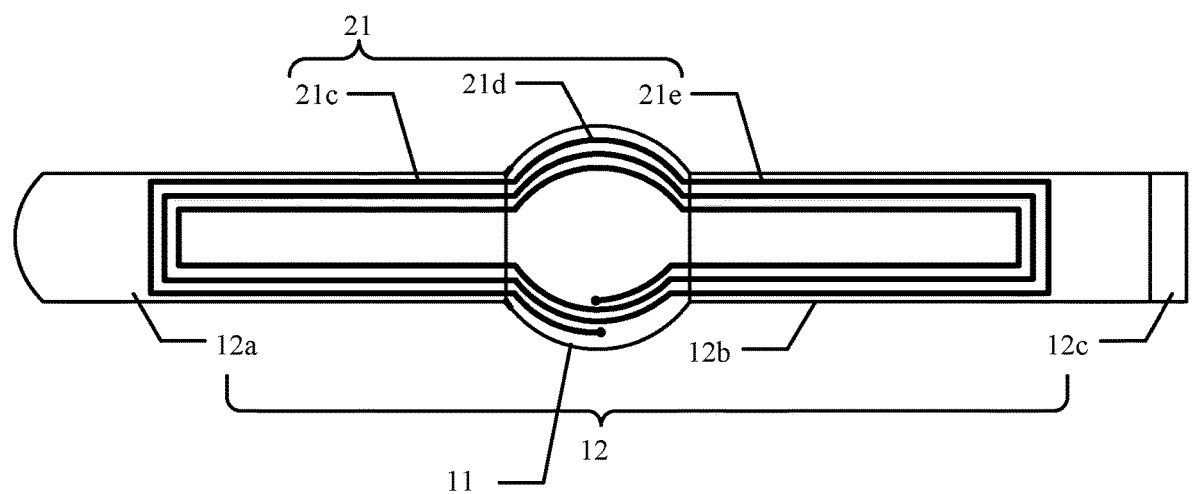
FIG. 6 is a diagram of yet another example power receiving antenna, in accordance with embodiments of the present invention.

Referring now to FIG. 6, shown is a diagram of yet another example power receiving antenna, in accordance with embodiments of the present invention. In this particular example, power receiving antenna 21 can include a receiving coil, and the receiving coil can include portion 21*c* disposed on wearing portion 12*a*. Portion 12*b* can be disposed on wearing portion 12*b*, and portion 21*e* may be disposed on main body 11. That is to say, each coil turn that crosses through watchband 12 or main body 11 in the axial direction may have a portion formed on portion 12*a* of the watchband, a portion formed on main body 11, and a portion formed on portion 12*b* of the watchband. Therefore, the area of main body 11 can effectively be used to obtain a coil of a larger area, in order to further improve the power transmission efficiency. When watchband 12 only includes one wearing portion, the receiving coil can be disposed on portion 12*a* of the wearing member and portion 12*b* of the main body, where portions 12*a* and 12*b* form at least one coil turn. In addition, the smart watch using the power receiving antenna of FIG. 6 can also be coupled to the power transmitter examples of FIGS. 3A, 3B, 4, and 5.

Figure 7:
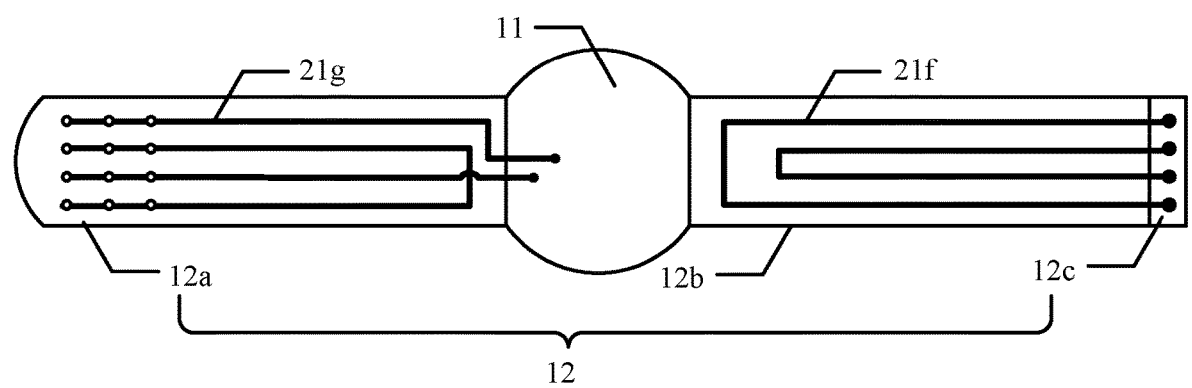
FIG. 7 is a diagram of still yet another power receiving antenna, in accordance with embodiments of the present invention.

Referring now to FIG. 7, shown is a diagram of still yet another power receiving antenna, in accordance with embodiments of the present invention. In this particular example, watchband 12 can include wearing portion 12*a*, wearing portion 12b, and connection portion 12c. Wearing portions 12a and 12b can be coupled through connection portion 12c. In this particular example, power receiving antenna 21 can include at least one receiving coil. Each receiving coil can include 21f partially disposed on wearing portion 12a, and portion 21g partially disposed on wearing portion 12b. The conducting wires of portions 21f and 21g that extend in a perpendicular direction may be disposed near main body 11, or on main body 11. The receiving coil can also include a portion extending to connection portion 12c.

Connection portion 12c can mechanically couple wearing portion 12a with wearing portion 12b, and can electrically couple the conducting wires that extend to connection portion 12c. After wearing portion 12a is coupled with wearing portion 12b, the corresponding wires of portions 21a and 21b can be electrically coupled to form at least one coil turn. In this particular example, the coil turn may be formed only after watchband 12 and main body 11 are coupled together in a ring shape. Thus, the wearable electronic device using the power receiving antenna of this example can be coupled to the power transmitter examples of FIGS. 3 and 4.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power receiving device of a contactless power supply configured in a wearable electronic device having a main body coupled to a wearing member, wherein said wearing member comprises first and second wearing portions that are coupled through a connection portion, said power receiving device comprising:
    a) a power receiving antenna comprising a receiving coil having a first portion disposed on said wearing member, and a second portion disposed on said main body;
    b) wherein said receiving coil with said first and second portions together forms a plurality of concentric coil turns on a surface of said wearing member and said main body;
    c) wherein an axis of said receiving coil is perpendicular to said surface of said wearing member and said main body, in order to coincide with an axis of a transmitting coil to receive power from a power transmitter antenna to wirelessly charge said wearing member; and
    d) wherein said connection portion is used to mechanically couple said first wearing portion to said second wearing portion, and to electrically couple corresponding conducting wires disposed on said first wearing portion and said second wearing portion, in order to form each of said plurality of concentric coil turns.

2. The power receiving device of claim 1, wherein said first portion of said receiving coil is disposed on said first and second wearing portions.

3. The power receiving device of claim 1, further comprising a plurality of receiving coils, wherein each receiving coil is selectable.

4. The power receiving device of claim 1, wherein said power is received from said power transmitter antenna based on said selected receiving coil.

5. The power receiving device of claim 1, wherein said receiving coil is formed inside said wearing member.

6. The power receiving device of claim 1, wherein said wearable electronic device is a smart watch, and said wearing member is a watchband.

7. A power receiving device of a contactless power supply configured in a wearable electronic device having a main body coupled to a wearing member, wherein said wearing member comprises first and second wearing portions that are coupled through a connection portion, said power receiving device comprising:
    a) a power receiving antenna comprising a plurality of receiving coils, wherein each receiving coil comprises a first portion disposed on said wearing member, a second portion disposed on said main body, and a third portion extending to said connection portion;
    b) wherein each receiving coil with said first and second portions together forms a plurality of concentric coil turns on a surface of said wearing member and said main body;
    c) wherein an axis of each receiving coils coil is perpendicular to a surface of said wearing member, in order to coincide with an axis of a transmitting coil to receive power from a power transmitter antenna to wirelessly charge said wearing member; and
    d) wherein said connection portion is used to mechanically couple said first wearing portion to said second wearing portion, and to electrically couple corresponding conducting wires disposed on said first wearing portion and said second wearing portion, in order to form each of said plurality of concentric coil turns.

8. The power receiving device of claim 7, wherein each of said plurality of receiving coils is formed inside said wearing member.

9. The power receiving device of claim 7, wherein said wearable electronic device is a smart watch, and said wearing member is a watchband.

10. The power receiving device of claim 7, wherein each of said plurality of receiving coils is selectable.

11. The power receiving device of claim 10, wherein said power is received from said power transmitter antenna based on said selected receiving coil.

* * * * *